US005737424A

United States Patent [19]
Elteto et al.

[11] Patent Number: 5,737,424
[45] Date of Patent: Apr. 7, 1998

[54] METHOD AND SYSTEM FOR SECURE DISTRIBUTION OF PROTECTED DATA USING ELLIPTIC CURVE SYSTEMS

[75] Inventors: Laszlo Elteto, Stamford, Conn.; Jose Pastor, Zaragoza, Spain

[73] Assignee: Software Security, Inc., Darien, Conn.

[21] Appl. No.: 658,072

[22] Filed: Jun. 4, 1996

[51] Int. Cl.[6] .................. H04L 9/28; H04L 9/00
[52] U.S. Cl. .................................. 380/28; 380/4
[58] Field of Search ........................... 380/4, 28

[56] References Cited

U.S. PATENT DOCUMENTS

| | | | |
|---|---|---|---|
| 4,995,082 | 2/1991 | Schnorr | 380/23 |
| 5,081,676 | 1/1992 | Chou et al. | 380/4 |
| 5,146,500 | 9/1992 | Maurer | 380/30 |
| 5,159,632 | 10/1992 | Crandall | 380/28 |
| 5,222,133 | 6/1993 | Chou et al. | 380/4 |
| 5,271,061 | 12/1993 | Crandall | 380/28 |
| 5,272,755 | 12/1993 | Miyaji et al. | 380/30 |
| 5,351,297 | 9/1994 | Miyaji et al. | 380/28 |
| 5,373,560 | 12/1994 | Schlafly | 380/30 |
| 5,442,707 | 8/1995 | Miyaji et al. | 380/30 |

OTHER PUBLICATIONS

"Embedding Messages On Elliptic Curves", Chapter 6.1, pp. 130–134.

*Primary Examiner*—Thomas H. Tarcza
*Assistant Examiner*—Carmen D. White
*Attorney, Agent, or Firm*—Pollock, Vande Sande & Priddy

[57] ABSTRACT

A method and system for secure distribution of protected data using elliptic curve systems includes a program to unlock software. The user obtains an encrypted unlocking code from a processing center and enters it into the unlocking program, which decrypts the message, yielding the unlocking code, then uses the unlocking code to unlock the software. To encrypt the unlocking code, the processing center selects an appropriate unlocking code using information received from the user, selects an elliptic curve to use, selects a first point on the elliptic curve having an index corresponding to the information to be encrypted, generates a delta key and a center key and the finite field inverse of the center key, selects a second point on the elliptic curve which is the product of the inverse of the center key and the first point, and generates an index of the second point, which, with the delta key, is the encrypted information. To decrypt the unlocking code, the user system generates the center key, selects a point on the elliptic curve having an index corresponding to the received point index, selects a second point on the elliptic curve which is the product of the first point and the center key, and generates the index of the second point, which is the decrypted unlocking code.

45 Claims, 7 Drawing Sheets

FIG. 4
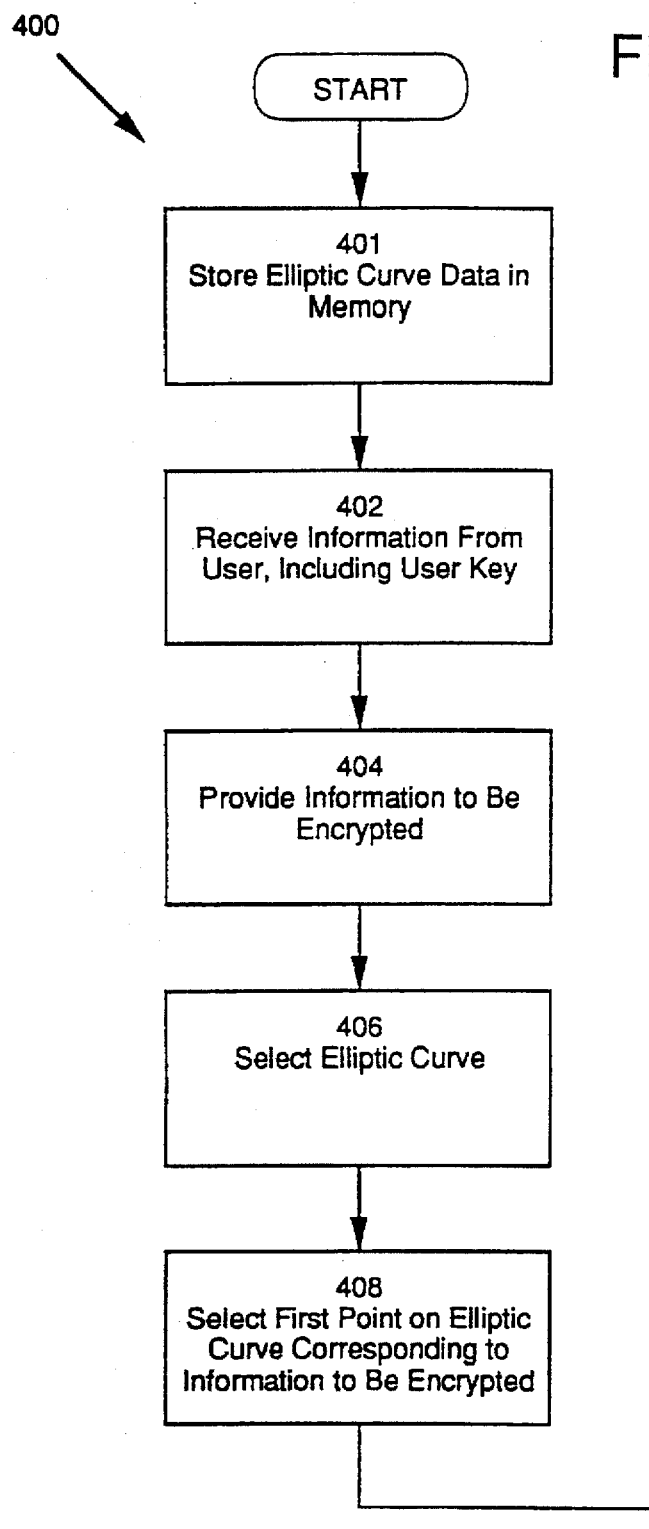
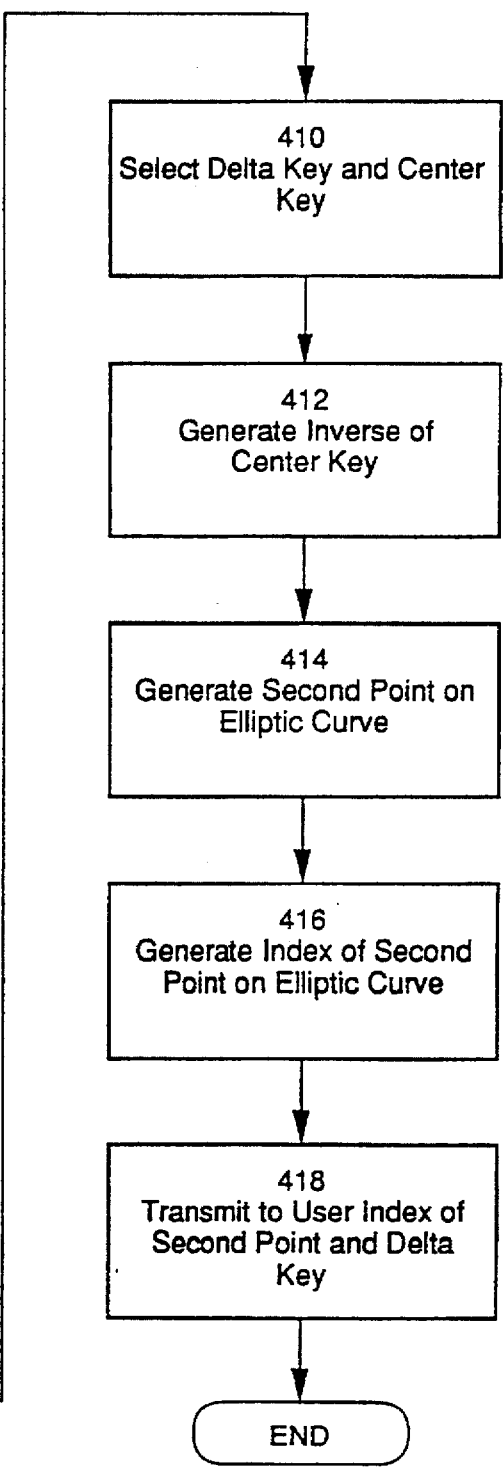

METHOD AND SYSTEM FOR SECURE DISTRIBUTION OF PROTECTED DATA USING ELLIPTIC CURVE SYSTEMS

BACKGROUND OF THE INVENTION

1. Field of the Invention

The present invention relates to a method and apparatus for the secure distribution of protected data, and in particular to encryption and decryption of data using elliptic curve systems.

2. Background Information

There are currently a variety of means for protecting computer software, which may include programs, data, or both, from unauthorized use. One way to protect software is to use a hardware device attached to a serial or parallel port of a computer. The protected software must detect the presence of the device in order to operate. Another way to protect software involves the use of a software unlocking code. The user must obtain and enter the correct code in order to use the software. A low-security implementation uses a single key for all copies of the software. A higher-security method uses a different key for each copy. Still higher security may be obtained by using two keys, both of which must be correct in order to use the software.

The first key is advantageously a unique identifier of the particular piece of hardware in use. This may be arranged by using an attached hardware device having a unique ID, or it may be arranged by storing the unique ID on the computer itself. For example, the ID may be stored on the computer hard drive, in non-volatile RAM or even in ROM. This unique identifier is known as the computer fingerprint.

In order to use the software, the user must obtain the second, or unlocking code. Typically, the user will transmit the first key to a processing or fulfillment center and obtain the second key, with which the software can be unlocked. The transmission can be performed several way. In some systems, the user calls a fulfillment center on the telephone and reads the first key to a human operator at the fulfillment center. The human operator then reads the second key to the user, who enters it into his computer. In an automated system, the human operator is replaced with an automated telephone key recognition system. The user enters the first key by pressing telephone keys and an automated system reads back the unlocking code to him. In still another system, the user dials the processing center with a modem and the information exchange process is fully automated.

While the procedure for obtaining the unlocking code has some affect on overall security, the processing of the exchanged information is more important. In a simple system, the user simply transmits the first key to the processing or fulfillment center and receives the unlocking code. To provide enhanced security, the unlocking code may be encrypted, using the first key in the encryption process. The user only deals with the encrypted code and never has access to the decrypted code. This ensures that the same unlocking code cannot be used to unlock software on multiple computers, because only the computer containing the first key used to encrypt the unlocking code can decrypt the key.

One algorithm which has been used to encrypt unlocking codes is the well-known RSA algorithm. However, a problem arises when RSA is used for this purpose. In order to obtain a reasonable level of security, the output messages from RSA are quite long. For example, a typical message using RSA and providing a minimum acceptable level of security may be 45 digits in length. This is too long for use where users are obtaining keys over the telephone: they must record and enter messages of 45 digits in length with no errors. This is beyond the acceptable level of ease of use of most users. What is needed is an encryption method which provides an acceptable level of security, while at the same time allows the use of shorter messages.

SUMMARY OF THE INVENTION

The present invention encrypts messages, such as unlocking codes, using families of elliptic curves. For a given level of security, elliptic curve encryption generates encrypted unlocking codes which are significantly shorter than encrypted unlocking codes generated by other encryption methods.

Locked software includes an unlocking program which the user runs when he wishes to unlock the software. Upon running the unlocking program, the user is presented with a screen displaying information including the identity of the software, a unique identifier of the computer in use and a user key generated by the unlocking program. The user calls a fulfillment center to obtain an unlocking code based on computer derived information. The processing center generates an encrypted unlocking code based on this information and provides the encrypted unlocking code to the user. The user enters the encrypted unlocking code into the unlocking program, which decrypts the message, yielding the decrypted unlocking code. The unlocking program then uses the unlocking code to unlock the software.

The unlocking code is derived by the processing center from the identity of the locked software and the unique identifier of the computer in use which are received from the user. The selected unlocking code is then encrypted using elliptic curve encryption. A first point on the elliptic curve in use is selected which has an index corresponding to the information to be encrypted. A second point on the elliptic curve is determined from the first point using information derived from the user key. The encrypted information sent to the user is the index of the second point on the elliptic curve together with the information derived from the user key which relates the second point to the first.

Upon receipt of the encrypted information, comprising the index of the second point on the elliptic curve and the information derived from the user key which relates the second point to the first, the user enters the information into the unlocking program running on his computer system. The unlocking program selects the point on the elliptic curve having an index corresponding to the received index of the second point. The unlocking program then determines the first point on the elliptic curve from the user key and the information relating the second point to the first. The index of the first point is the decrypted information. The decrypted information is used by the unlocking program as an unlocking code to unlock the protected software.

BRIEF DESCRIPTION OF THE DRAWINGS

FIG. 4 is a block diagram of an encryption process 400 in accordance with the present invention.

DETAILED DESCRIPTION OF THE INVENTION

Figure 1:
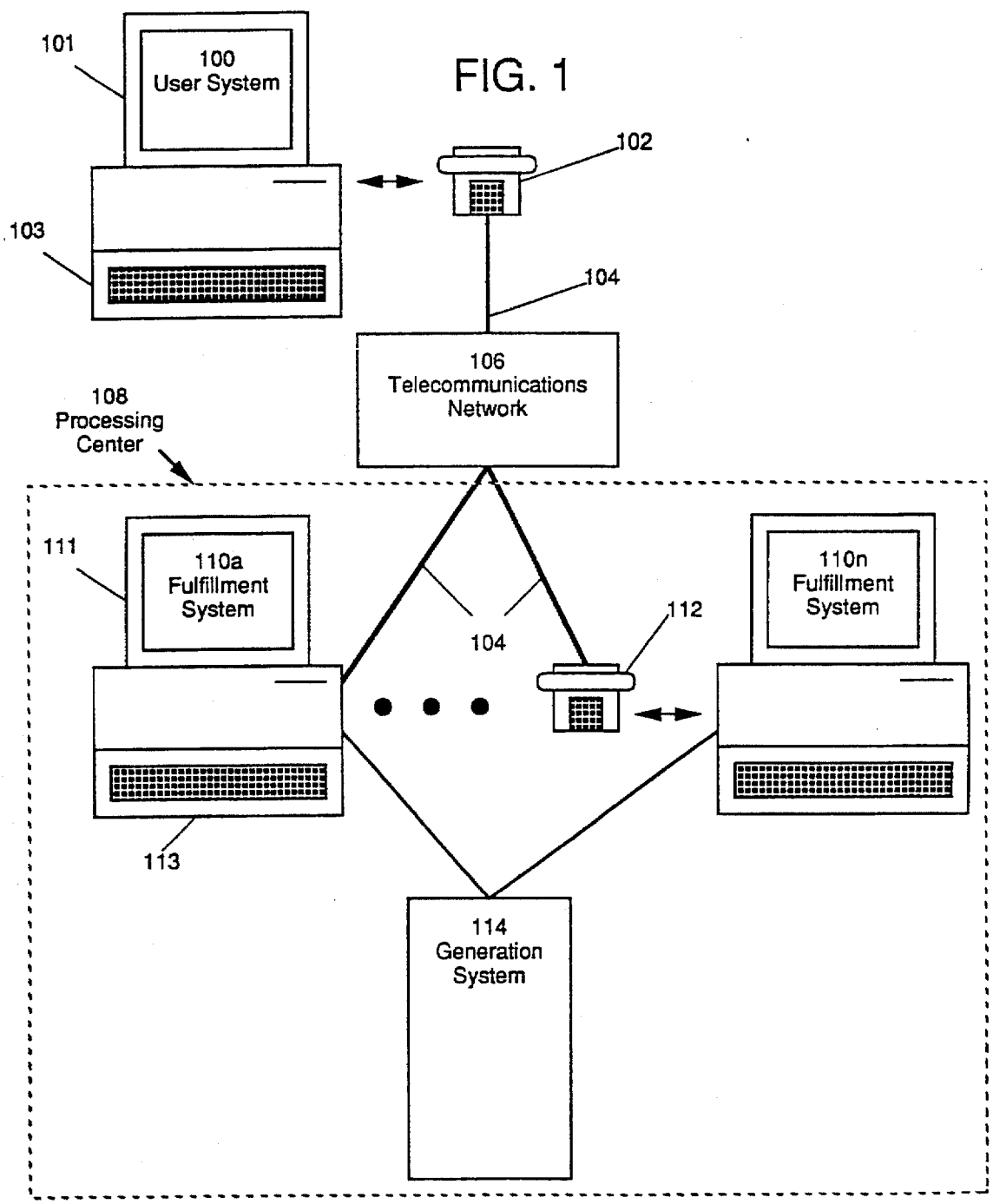
FIG. 1 is an exemplary block diagram of an encryption/decryption system in accordance with the present invention.

FIG. 1 is an exemplary block diagram of a preferred embodiment of an encryption/decryption system in accordance with the present invention. User system 100 is typically a personal computer, but may be a higher-end system, such as a workstation, minicomputer, etc. User system 100 includes an output device 101, such as, for example a display monitor, flat-panel display, printer, etc. User system 100 also includes an input device 103, such as for example, a keyboard, mouse, graphics tablet, etc. Typically, the user will obtain the desired unlocking information by calling processing center 108 using telephone 102. Telephone 102 is linked to telephone network 106 over telephone lines 104, as is processing center 108. In this case, the user manually transfers information between user system 100 and processing center 108 using telephone 102. Processing center 108 includes fulfillment systems 110a–n. The actual number of fulfillment systems depends on the volume of traffic which must be handled and may vary from one system to possibly dozens, or more. Each fulfillment system 110a–n includes an output device 111, such as, for example a display monitor, flat-panel display, printer, etc. Each fulfillment system 110a–n also includes an input device 103, such as for example, a keyboard, mouse, graphics tablet, etc. Fulfillment systems, such as system 110a, may be directly linked to telephone network 106, in which case the system must have automated response and/or voice recognition capability. On the other hand, fulfillment systems, such as system 110n, may not be directly linked, in which case information must be transferred manually between telephone 112 and system 110n by a human operator. Fulfillment systems 110a–n are linked to generation system 114. Fulfillment systems are typically personal computers or workstations, but may also be terminals on higher-end systems, such as minicomputers or mainframes.

Generation system 114 is used to generate the elliptic curves which are used in the encryption process. Although in some embodiments of the present invention, generation system 114 may be a personal computer or workstation, it is likely that an embodiment using a higher end system will be preferred. Generation of elliptic curves which provide an adequate level of security is a time consuming process. System 114 must be selected to provide adequate performance.

A single elliptic curve may be adequate to encrypt a large number of different unlocking codes. If one elliptic curve is used to encrypt many unlocking codes, it will be necessary to generate elliptic curves only occasionally. In this case, a computation time of several days may be acceptable and a lower performance computer system may provide adequate performance. It may be that, for security reasons, many different elliptic curves are required. In this case, a shorter computation time is required and a higher performance computer system is needed. It is also possible to combine generation system 114 with one or more fulfillment systems 110a–n. This embodiment is feasible if performance requirements are sufficiently relaxed.

The data representing an elliptic curve which has been generated must be loaded into fulfillment systems 110a–n. This may be accomplished using a wide/local area network, such as, for example, ethernet or token ring, over links 116. It may also be accomplished using portable storage media, such as, for example, floppy disks, CD ROMs or magnetic tapes.

Figure 2:
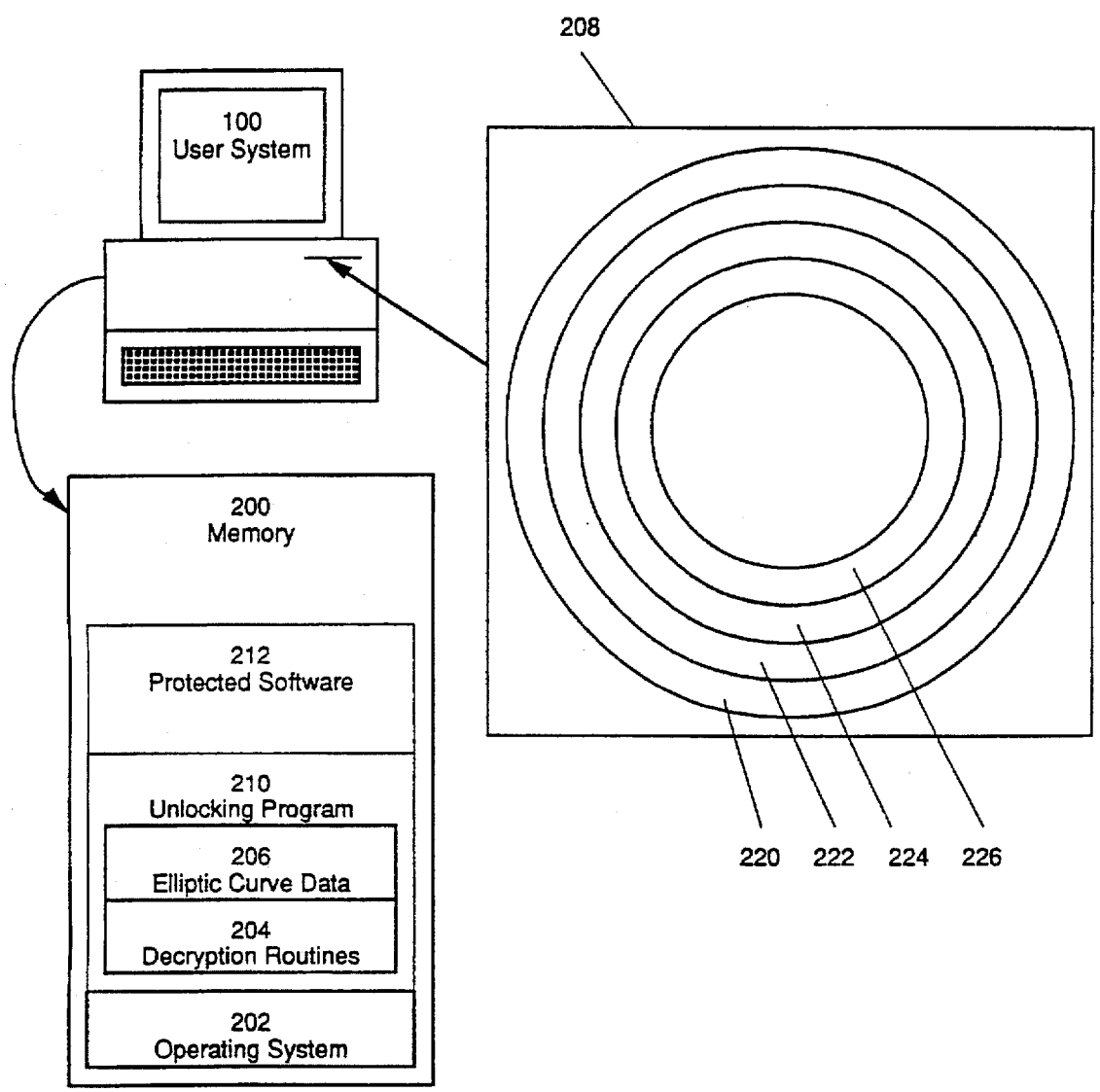
FIG. 2 is an exemplary block diagram of the structure of the distribution media and the memory of user system 100 of FIG. 1.

As shown in FIG. 2, the elliptic curve data must be loaded into user system 100. This is accomplished by including the elliptic curve data, along with program code to process that data, in the media used to distribute the software which is to be unlocked. FIG. 2. shows media 208, which in this example is a floppy disk. In a typical arrangement, media 208 contains partition 220, which contains the locked software, which may be program code, data or both. Media 208 contains partition 222, which contains the program code which implements the unlocking program. Media 208 contains partition 224, which contains program code which implements the decryption process. Media 208 also contains partition 226, which contains the elliptic curve data. Although a typical arrangement is shown, other arrangements are common. The partitions shown may be arranged on more than one media, in any combination.

When media 208 is inserted into an appropriate mechanism in user system 100, the contents of partitions 220–226 may be read into user system 100 and stored in memory 200, which is part of user system 100. Memory 200 may include both volatile storage devices, such as, for example, random access memory (RAM) and non-volatile storage devices, such as, for example, hard disk, floppy disk, optical disk, electrically-alterable programmable read only memory, battery-backed up RAM, etc. Memory 200 contains operating system 202. Once the contents of media 208 have been read, memory 200 also contains unlocking program 210, which includes decryption routines 204 and elliptic curve data 206. Unlocking program 210, including decryption routines 204, is executed by the processor of user system 100, which results in the performance of the decryption process. During execution of decryption routines 204, the processor of user system 100 also accesses elliptic curve data 206, in order to carry out the decryption process. Locked software 212 may also be stored in the memory of user system 100, although in some embodiments only the unlocked version of software 212 is stored in memory 200.

At this point, it is useful to define some terminology.

A mathematical field consists of a set of elements and two operations, denoted addition and multiplication, which satisfy certain properties. The operations are not necessarily defined in the conventional way. One of these properties is that a field must have a neutral element for multiplication, denoted 1, such that for every element e there must exist an inverse element $e^{-1}$ satisfying $e \cdot e^{-1}=1$. A well-known example of a field is the field of real numbers for which addition and multiplication are defined in the conventional way. It may be noted that the set of all integers does not form a field because there does not exist for every integer another integer that multiplies with it to 1 (e.g. ½ is not an integer). Fractions would be required, and indeed, the set of all rational numbers (i.e. fractions) forms a field. In cryptography, one is particularly interested in finite fields, i.e. fields whose sets are finite rather than infinite. A field is denoted F. A finite field with p member is denoted $F_p$ and comprises the integers 0,1,2,3 . . . p-1.

An elliptic curve over a finite field $F_p$ consists of the set of distinct pairs of integers (x,y) which satisfy the conditions:

$$0 \leq x < p, \text{ and } 0 \leq y < p,$$

and the equation $$y^2 = x^3 + a \cdot x + b \pmod{p},$$

where a and b are parameters of the elliptic curve. Such a solution pair is called a point, denoted P, on the elliptic curve. In addition to the solution points of the above equation, an elliptic curve also contains a so-called point at infinity, denoted ∞. For notational convenience, the elliptic curve satisfying the above equation over a finite field $F_p$ is denoted $E_{a,b}(F_p)$. The number of points on a given elliptic curve may be determined by finding all the points on the elliptic curve and counting them.

The addition of two points, $P=(x_1,y_1)$ and $Q=(x_2,y_2)$, on an elliptic curve over a finite field, $E_{a,b}(F_p)$, yields a third point on the elliptic curve, $R=(x_3,y_3)$, if $P \neq Q$ and $P \neq -Q$, with the definition that if $P=(x_1,y_1)$, then $-P=(x_1,-y_1)$, The addition operation is performed by computing λ according to:

$$\lambda = [(y_2-y_1)/(x_2-x_1)] \pmod{p} \text{ if } P \neq Q$$

$$\lambda = [(3x_1^2+a)/(2y_1)] \pmod{p} \text{ if } P = Q$$

and computing $(x_3,y_3)$ according to:

$$x_3 = \lambda^2 - x_1 - x_2 \pmod{p}$$

and $$y_3 = \lambda \cdot (x_1 - x_3) - y_1 \pmod{p}.$$

All operations must be performed in the finite field $F_p$. Thus, the division operation used in computing λ involves the inverse, $e^{-1}$, as described above, not conventional division.

The multiplication of a point P on an elliptic curve over a finite field, $E_{a,b}(F_p)$, by an integer n, is denoted n·P and yields a second point on the elliptic curve, Q. For small numbers n, multiplication can be performed simply by repeatedly adding a point to the accumulated sum. For larger numbers n, efficiency is improved by use of the repeated doubling method, which is particularly suited to use with binary computation systems. In the repeated doubling method, n·P is computed by repeated doubling and adding the point to the accumulated sum. For example, the computation 22·P is broken down as 2·((2·((2·(2·P))+P))+P). This corresponds to doubling P (2·P=P+P), doubling that result (4·P=2·P+2·P), adding P to that result (5·P=4·P+P), doubling that result (10·P=5·P+5·P), adding P to that result (11·P=10·P+P), and finally doubling that result to yield 22·P (11·P+11·P).

A point P, on an elliptic curve over a finite field, $E_{a,b}(F_p)$, is a generator point if multiplications of P generate all the points on the curve. In other words, a point P is a generator point, if for any point X on the elliptic curve there is a number c such that X=c·P. If an elliptic curve has a prime number of points, then all points on that elliptic curve are generator points.

Messages may be embedded on elliptic curves by establishing a one to one correspondence between points on an elliptic curve or curves and a consecutive set of integers. In the general case of elliptic curves, there is not such a one to one correspondence. Only a portion of the desired integers correspond to points on a particular curve. This problem may be overcome by the use of two elliptic curves in a twisted pair. If two elliptic curves are in a twisted pair relationship, the integers not represented on one curve are represented on the other curve. The union of the two elliptic curves is the twisted pair.

For an elliptic curve $E_{a,b}(F_p)$, there is another elliptic curve with which it will form a twisted pair, denoted $T_{a,b,\beta}(F_p)$, for each quadratic nonresidue in the field $F_p$. For a twisted pair factor, denoted β, which is a quadratic nonresidue, the other curve of the twisted pair, satisfies the equation $$y^2 = x^3 + a' \cdot x + b' \pmod{p},$$

where $a'=a \cdot \beta^2 \pmod{p}$, and $b'=b \cdot \beta^3 \pmod{p}$. Thus, the other curve of the twisted pair may be denoted $E_{a\beta^2,b\beta^3}(F_p)$, A point on the elliptic curve $E_{a,b}(F_p)$ is denoted (x,y), while a point on the other curve of the twisted pair, $E_{a\beta^2,b\beta^3}(F_p)$, is denoted (x,y)'.

The number of points on a twisted pair $T_{a,b,\beta}(F_p)$ is equal to 2·p+2. If the number of points on the elliptic curve $E_{a,b}(F_p)$ is q, then the number of point on the other curve of the twisted pair, $E_{a\beta^2,b\beta^3}(F_p)$ is r, which is equal to 2·p+2–q. If both q and r are selected to be a prime numbers, all the points on $T_{a,b,\beta}(F_p)$ will be generator points.

An integer, known as an index and denoted τ, which corresponds to a point on the twisted pair curves may be determined as follows:

$$\tau = \begin{cases} 2x + sgn(y), & \text{if } P = (x,y), y \neq 0; \\ 2x/\beta + sgn(y), & \text{if } P = (x,y)', y \neq 0; \\ 2x, & \text{if } P = (x,0); \\ 2x/\beta + 1, & \text{if } P = (x,0)'; \\ 2p, & \text{if } P = \infty; \\ 2p+1, & \text{if } P = \infty'; \end{cases}$$

$$\text{where } sgn(y) = \begin{cases} 0, & \text{if } (p-1)/2 \geq y > 0; \\ 1, & \text{otherwise}. \end{cases}$$

For example, Table 1 shows the points on elliptic curve $E_{3,1}(F_{31})$, their corresponding index integer τ, the other curve of the twisted pair for a β of 3, $E_{27,27}(F_{31})$, and corresponding index integers of that curve.

TABLE 1

| Index τ | Point on $E_{3,1}(F_{31})$ | Index τ | Point on $E_{27,27}(F_{31})$ |
|---|---|---|---|
| 0 | (00,01) | 24 | (05,15) |
| 1 | (00,30) | 25 | (05,16) |
| 2 | (01,06) | 4 | (06,08) |
| 3 | (01,25) | 5 | (06,23) |
| 12 | (06,07) | 46 | (07,01) |
| 13 | (06,24) | 47 | (07,30) |
| 16 | (08,14) | 6 | (09,10) |
| 17 | (08,17) | 7 | (09,21) |
| 20 | (10,15) | 8 | (12,08) |
| 21 | (10,16) | 9 | (12,23) |
| 22 | (11,01) | 50 | (13,08) |
| 23 | (11,30) | 51 | (13,23) |
| 26 | (13,06) | 30 | (14,07) |
| 27 | (13,25) | 31 | (14,24) |
| 28 | (14,11) | 10 | (15,05) |
| 29 | (14,20) | 11 | (15,26) |
| 34 | (17,06) | 32 | (17,06) |
| 35 | (17,25) | 33 | (17,25) |
| 36 | (18,11) | 14 | (21,11) |
| 37 | (18,20) | 15 | (21,20) |
| 38 | (19,02) | 56 | (22,04) |

TABLE 1-continued

| Index τ | Point on $E_{3,1}(F_{31})$ | Index τ | Point on $E_{27,27}(F_{31})$ |
|---|---|---|---|
| 39 | (19,29) | 57 | (22,27) |
| 40 | (20,01) | 18 | (27,14) |
| 41 | (20,30) | 19 | (27,17) |
| 42 | (21,05) | 63 | ∞(identity) |
| 43 | (21,26) | | |
| 44 | (22,12) | | |
| 45 | (22,19) | | |
| 48 | (24,03) | | |
| 49 | (24,28) | | |
| 52 | (26,04) | | |
| 53 | (26,27) | | |
| 54 | (27,07) | | |
| 55 | (27,24) | | |
| 58 | (29,07) | | |
| 59 | (29,24) | | |
| 60 | (30,11) | | |
| 61 | (30,20) | | |
| 62 | ∞(identity) | | |
| Number of Points: 39 | | Number of Points: 25 | |

For each twisted pair, $T_{a,b,\beta}(F_p)$, there is another twisted pair, $T_{a',b',\beta}(F_p)$, which is isomorphic, if and only if $a'=a\cdot u^4$ (mod p) and $b'=b\cdot u^6$ (mod p), where u, known as the isomorphism factor, is selected from $F_p$. Thus, the isomorph of the curve $E_{a,b}(F_p)$ may be denoted $E_{au^4,bu^6}(F_p)$ and the other curve of the isomorphic twisted pair may be denoted $E_{a\beta^2 u^4,b\beta^3 u^6}(F_p)$. Isomorphic twisted pairs have the same number of points and the same indices τ, but the points themselves and the mapping of the indices to the points are different.

For example, Table 2 shows the points on elliptic curve $E_{30,16}(F_{31})$, their corresponding indices τ, the other curve of the twisted pair for a β of 11, $E_{3,30}(F_{31})$, and corresponding indices of that curve. This twisted pair is isomorphic with $E_{3,1}(F_{31})$ and $E_{27,27}(F_{31})$ with isomorphism factor, u=13. To demonstrate, $a \cdot u^4 = 3 \cdot 13^4 = 85683 = 30$ (mod 31) and $b \cdot u^6 = 1 \cdot 13^6 = 4826809 = 16$ (mod 31). Likewise, $a \cdot \beta^2 \cdot u^4 = 3 \cdot 11^2 \cdot 13^4 = 10367643 = 3$ (mod 31) and $b \cdot \beta^3 \cdot u^6 = 1 \cdot 11^3 \cdot 13^6 = 6424482779 = 30$ (mod 31).

TABLE 2

| Index τ | Point on $E_{30,16}(F_{31})$ | Index τ | Point on $E_{3,30}(F_{31})$ |
|---|---|---|---|
| 0 | (00,04) | 40 | (03,02) |
| 1 | (00,27) | 41 | (03,29) |
| 2 | (01,04) | 18 | (06,04) |
| 3 | (01,27) | 19 | (06,27) |
| 6 | (03,03) | 24 | (08,15) |
| 7 | (03,28) | 25 | (08,16) |
| 8 | (04,13) | 14 | (15,03) |
| 9 | (04,18) | 15 | (15,28) |
| 12 | (06,03) | 48 | (16,12) |
| 13 | (06,28) | 49 | (16,19) |
| 20 | (10,13) | 26 | (19,08) |
| 21 | (10,18) | 27 | (19,23) |
| 28 | (14,07) | 4 | (22,07) |
| 29 | (14,24) | 5 | (22,24) |
| 30 | (15,11) | 10 | (24,10) |
| 31 | (15,20) | 11 | (24,21) |
| 32 | (16,02) | 16 | (26,13) |
| 33 | (16,29) | 17 | (26,18) |
| 34 | (17,13) | 50 | (27,04) |
| 35 | (17,18) | 51 | (27,27) |
| 36 | (18,08) | 22 | (28,05) |
| 37 | (18,23) | 23 | (28,26) |
| 38 | (19,06) | 56 | (29,04) |
| 39 | (19,25) | 57 | (29,27) |
| 42 | (21,07) | 63 | ∞(identity) |

TABLE 2-continued

| Index τ | Point on $E_{30,16}(F_{31})$ | Index τ | Point on $E_{3,30}(F_{31})$ |
|---|---|---|---|
| 43 | (21,24) | | |
| 44 | (22,03) | | |
| 45 | (22,28) | | |
| 46 | (23,15) | | |
| 47 | (23,16) | | |
| 52 | (26,12) | | |
| 53 | (26,19) | | |
| 54 | (27,07) | | |
| 55 | (27,24) | | |
| 58 | (29,14) | | |
| 59 | (29,17) | | |
| 60 | (30,04) | | |
| 61 | (30,27) | | |
| 62 | ∞(identity) | | |
| Number of Points: 39 | | Number of Points: 25 | |

Figure 3:
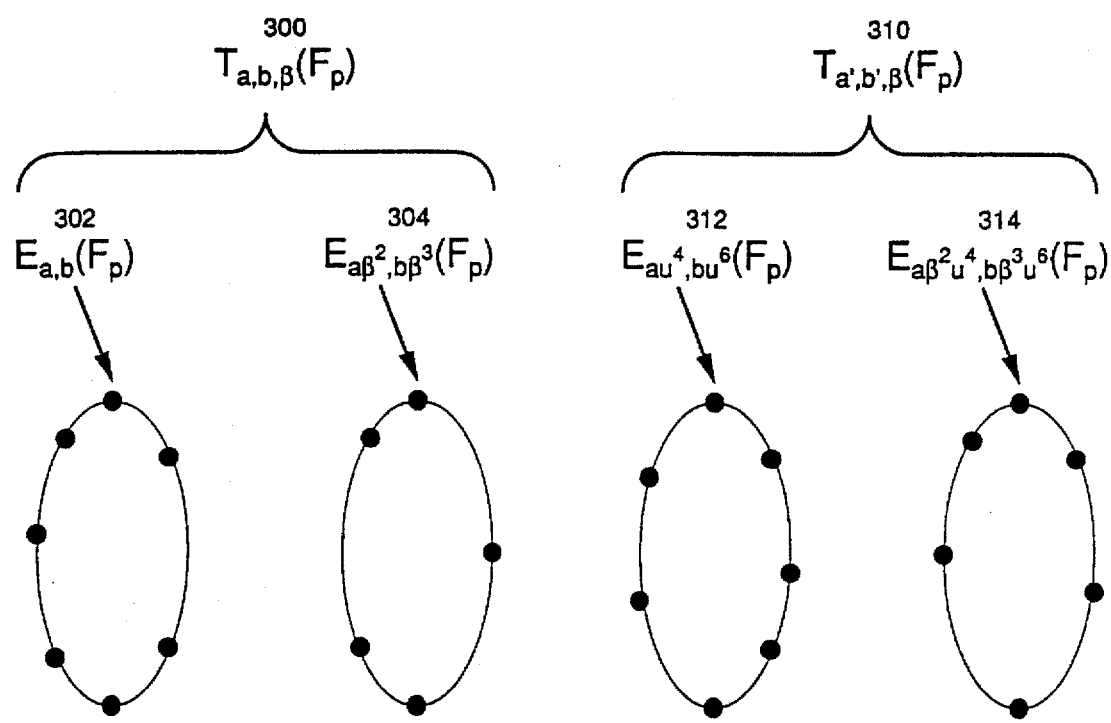
FIG. 3 is a pictorial representation of an elliptic curve family.

FIG. 3 is a pictorial representation of four embodiments of elliptic curves which are available. Twisted pair 300, $T_{a,b,\beta}(F_p)$, consists of two elliptic curves in a twisted pair: elliptic curve 302, $E_{a,b}(F_p)$, and elliptic curve 304, $E_{a\beta^2,b\beta^3}(F_p)$. Twisted pair 310, $T_{a',b',\beta}(F_p)$, which is isomorphic with twisted pair 300, consists of two elliptic curves in a twisted pair, elliptic curve 312, $E_{au^4,bu^6}(F_p)$, and elliptic curve 314, $E_{a\beta^2 u^4,b\beta^3 u^6}(F_p)$. Any of the four embodiments of elliptic curve may be selected for use, although use of the isomorphic embodiments may provide somewhat greater security.

FIG. 4 is a block diagram of an encryption process 400 of the present invention. The process begins with step 401, in which elliptic curve data representing an ellitpic curve generated by generation system 114 is stored in the memory of the computer system performing encryption process 400. Typically, this elliptic curve data is pregenerated by generation system 114, stored in memory once and used repeatedly for multiple unlocking codes which are encrypted. In step 402, information is received from the user. This information typically identifies the software to be unlocked, the particular computer system in use and a user key generated by the unlocking program. In step 404, the information to be encrypted is selected, based on the identity of the software to be unlocked and possibly on the computer system in use. Typically, this information is an unlocking code for a program or for a data file, such as a font. In step 406, an elliptic curve to be used is selected from among those elliptic curves which have already been generated by generation system 114. Once an elliptic curve has been selected, the elliptic curve data for that curve, which is stored in memory, is accessed. The same elliptic curve may be used for several pieces of information to be encrypted, or different curves may be used for each piece of information. The elliptic curve used may be any of those shown in FIG. 3, that is elliptic curve 302, $E_{a,b}(F_p)$, elliptic curve 304, $E_{a\beta^2,b\beta^3}(F_p)$, elliptic curve 312, $E_{au^4,bu^6}(F_p)$, or elliptic curve 314, $E_{a\beta^2 u^4,b\beta^3 u^6}(F_p)$. The selection of the elliptic curve has an effect on the information which must be included in the encrypted message.

In step 408, a first point on the elliptic curve is selected. The point selected is that point having an index equal to the information to be encrypted. In step 410, a delta key and a center key are selected. The center key is the sum of the user key and the delta key. The delta key is selected so that the center key is prime relative to the number of points on the elliptic curve. In step 412, the inverse of the center key is generated. The inverse of a number e is the number $e^{-1}$ such that $e \cdot e^{-1} = 1$ (mod p), where p is the number of points on the selected elliptic curve. Obviously, there are many such numbers, e. The smallest such number is selected for use in the present invention in order to minimize the necessary computations. In step 414, a second point on the elliptic curve is generated. This point is equal to the first point on the elliptic curve multiplied by the inverse of the center key, in accordance with multiplication of points on an elliptic curve as described above. In step 416, the index of the second point is generated. In step 418, a message containing the encrypted information is transmitted to the user. The message consists of the index of the second point of the elliptic curve and the delta key selected by the processing center. Depending upon the elliptic curve selected in step 406, additional information may need to be included in the encrypted message. If elliptic curve 302, $E_{a,b}(F_p)$, is selected, only the index of the second point of the elliptic curve and the delta key need be included in the encrypted message. If elliptic curve 304, $E_{a\beta^2,b\beta^3}(F_p)$, is selected, twisted pair factor $\beta$ must also be included in the encrypted message. If elliptic curve 312, $E_{au^4,bu^6}(F_p)$, isomorphism factor u must also be included in the encrypted message. If elliptic curve 314, $E_{a\beta^2u^4,b\beta^3u^6}(F_p)$, is selected, both twisted pair factor $\beta$ and isomorphism factor u must be included in the encrypted message.

In order to ensure that all points generated as a result of the multiplication of the first point by the inverse of the center key are also points on the elliptic curve, the first point must be a generator point. Because any point on the curve could be selected as the first point, depending upon the data to be encrypted, the only way to ensure stable operation of the system is if all points on the curve are generator points. As described above, all points on an elliptic curve are generator points if the number of points on the curve is a prime number. Therefore, an elliptic curve is selected which has a prime number of points. To provide flexibility in the choice of the curve to be used, the other curve of the twisted pair is also selected so as to have a prime number of points.

Figure 5:
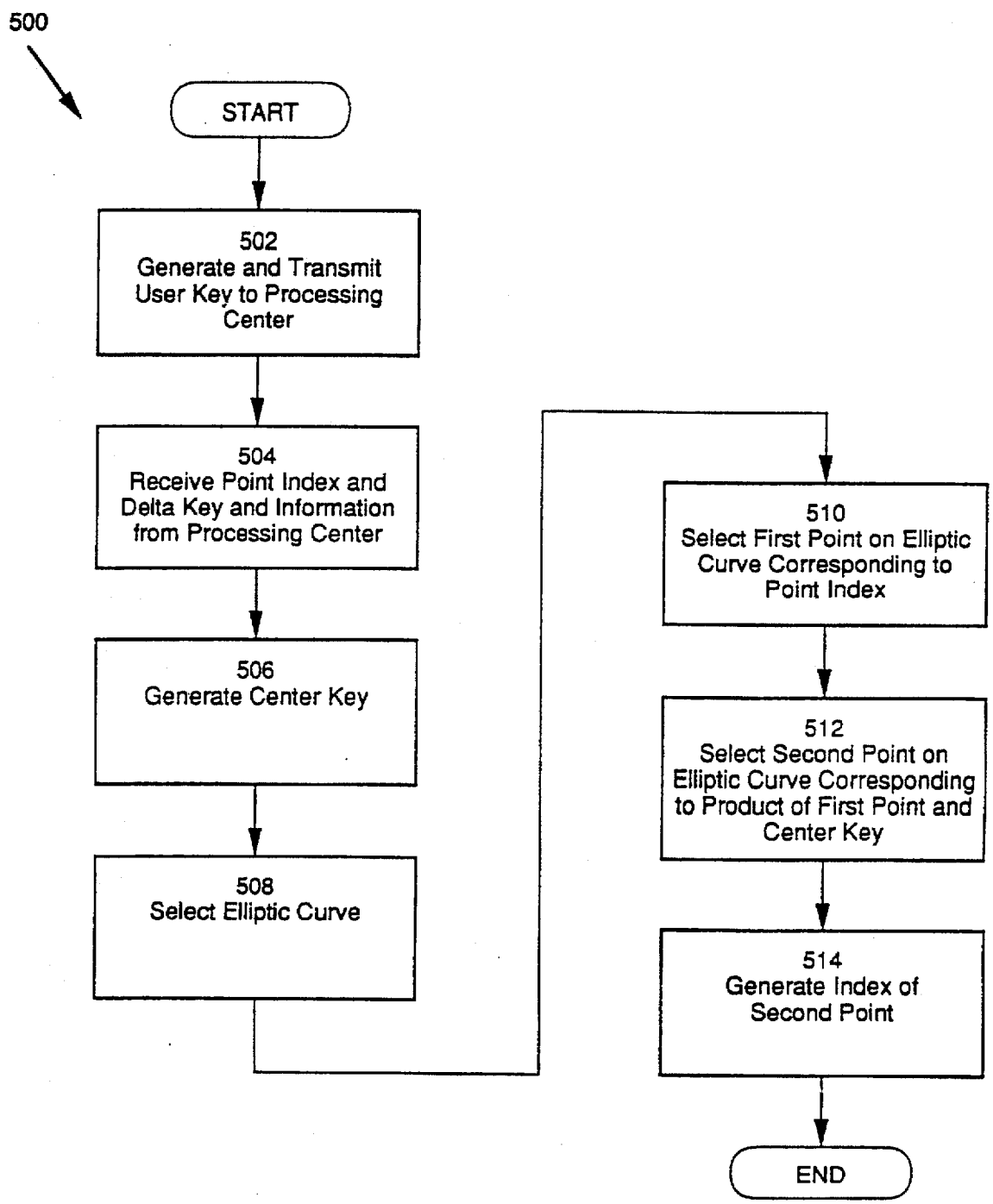
FIG. 5 is a block diagram of a decryption process 500 in accordance with the present invention.

FIG. 5 is a block diagram of a decryption process 500 of the present invention. In this embodiment, the elliptic curve $E_{a,b}(F_p)$ is used. Process 500 is implemented in decryption routines 204 of FIG. 2. The process begins with step 502, in which user system 100 generates information which typically identifies the software to be unlocked, the particular computer system in use and a user key generated by the unlocking program. The user transmits the user key to the processing center, typically over the telephone. The processing center then generates the encrypted information using encryption process 500 and transmits the encrypted information to the user system. In step 504, the user system receives the encrypted information which includes an index of a point on an elliptic curve and a delta key generated by the processing center. In other embodiments, the encrypted message includes additional information as is described below. In step 506, the user system generates the center key by summing the user key which was generated with the delta key received from the processing center.

In step 508, an elliptic curve is selected for use. In this embodiment, the elliptic curve selected is the elliptic curve represented by the contents of elliptic curve data partition 206. In other embodiments of the present invention, the additional information included in the encrypted message is used to select curves other than that represented by the contents of elliptic curve data partition 206. If only twisted pair factor $\beta$ 606 is present in encrypted message 600, the other curve of the twisted pair to which $E_{a,b}(F_p)$ belongs, $E_{a\beta^2,b\beta^3}(F_p)$, is selected. If only isomorphism factor u 608 is present in encrypted message 600, a curve which is isomorphic to $E_{a,b}(F_p)$, $E_{au^4,bu^6}(F_p)$, is selected. If both twisted pair factor $\beta$ 606 and isomorphism factor u 608 are present in encrypted message 600, a curve which is the other curve of the twisted pair to which a curve isomorphic to $E_{a,b}(F_p)$, $E_{a\beta^2u^4,b\beta^3u^6}(F_p)$, is selected.

Typically, user system 100 will only have data for one elliptic curve in its elliptic curve data partition 206. However, an embodiment is possible in which elliptic curve data partition 206 contains data for more than one elliptic curve. In such an embodiment, it is necessary to perform an additional step of selecting an elliptic curve from among those for which data is available, before step 508.

In step 510, a first point on the elliptic curve is selected. The point selected is that point having an index equal to the point index which was received from the processing center. In step 512, a second point on the elliptic curve is generated. This point is equal to the first point on the elliptic curve multiplied by the center key. In step 514, an index of the second point is generated. This index is the decrypted information. Typically, the decrypted information is an unlocking code, which is then used to unlock the desired software.

An example will serve to further illustrate the encryption and decryption processes. Assume the information to be encrypted is "27". The processing center has already generated a suitable elliptic curve. The elliptic curve is referenced and the point on the elliptic curve having an index of 27 is selected. Referring to Table 1 above, it is seen that this is the point (13,25) on the curve $E_{3,1}(F_{31})$. When a user desires to obtain this information, the user transmits a key, the user key, to the processing center. This key can be generated when needed and can be selected at random. The processing center receives the user key and selects a second key, the delta key, such that the sum of the user key and the delta key is prime relative to the number of point of the elliptic curve. This sum forms the encryption key. For example, assume the selected user key is 7. The processing center then has a choice of delta keys: 1, 3, 4, 7, 9, 10, 12, 13, 15, 16, 18, 21, 22, 24, 25, 27, 28, 30, or 31. Assume 1 is selected for the delta key. The encryption key is then 8. The elliptic inverse of the encryption key is then generated. This is 5. The product of the inverse of the encryption key and the selected point is then generated. This is the point (19,2), which has an index of 38. The information which is transmitted to the user is the index of the second point on the elliptic curve and the delta key selected by the processing center. Here, this is the message: "38,1".

Upon receipt of the encrypted message, the user may proceed with decryption. The user know the value of the user key which was selected, and has received the delta key in the message. The user then generates the encryption key. Here, the user key is 7 and the delta key is 1, so the encryption key is 8. The user has also received the index value of a point on the elliptic curve in the message. The user selects the point on the elliptic curve having that index value. Here, the index value is 38 and the corresponding point on the elliptic curve is (19,2). The user then generates the product of the encryption key and the selected point on the elliptic curve. This is the point (13,25), which has an index value of 27. This is the original information which was encrypted and has now been decrypted.

Figure 6A:
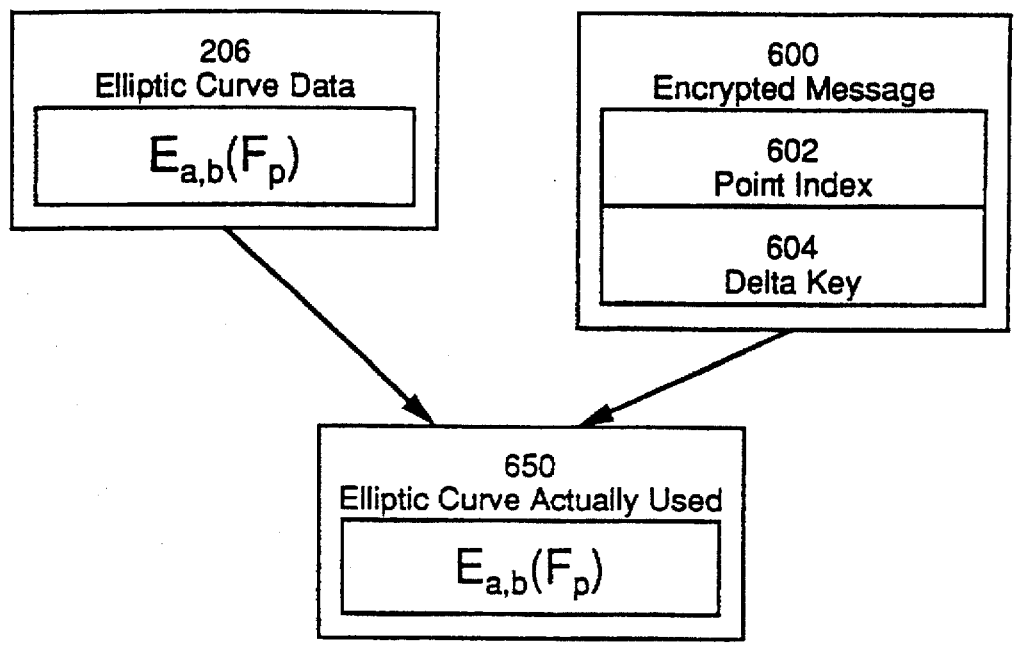
FIG. 6a is a schematic representations of the data used in one embodiment of the present invention.

FIG. 6a is a schematic representation of the data used in the above described embodiment of the present invention. In this embodiment, elliptic curve data partition 206 contains data which represents the elliptic curve $E_{a,b}(F_p)$. Encrypted message 600 includes point index 602 and delta key 604. The elliptic curve actually used is $E_{a,b}(F_p)$.

Figure 6B:
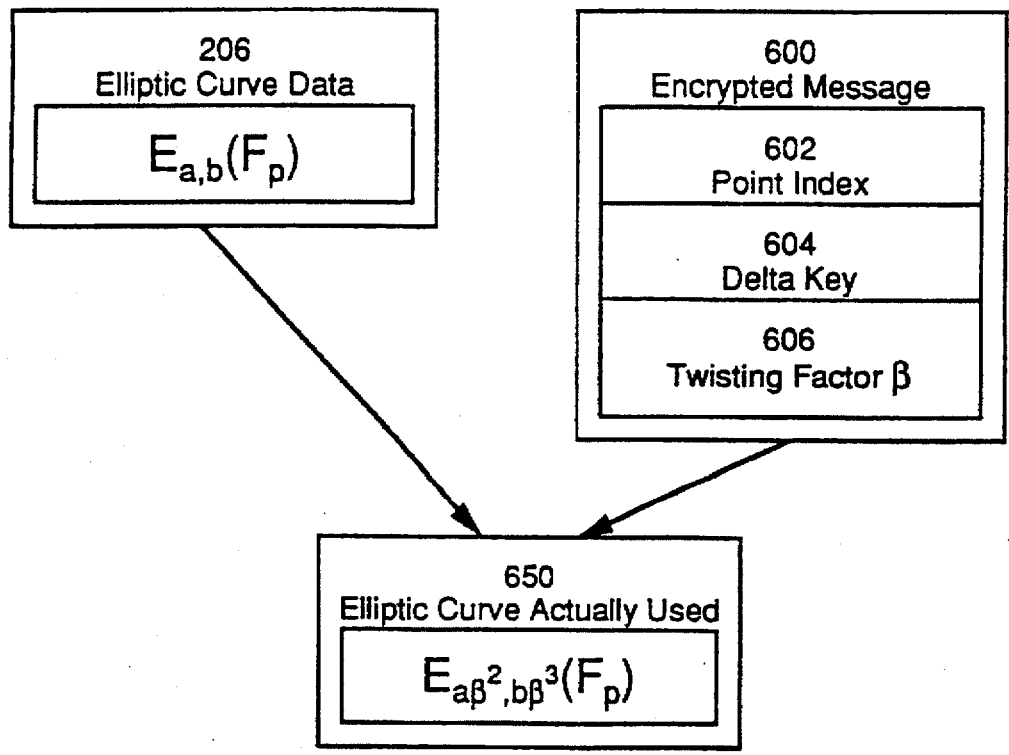
FIG. 6b is a schematic representations of the data used in another embodiment of the present invention.

FIG. 6b is a schematic representation of the data used in another embodiment of the present invention. In this embodiment, elliptic curve data partition 206 contains data which represents the elliptic curve $E_{a,b}(F_p)$. Encrypted message 600 includes point index 602, delta key 604 and twisted pair factor $\beta$ 606. The presence of only twisted pair factor $\beta$ 606 in encrypted message 600 signals decryption routines 204 to select for use, in step 508 of FIG. 5 above, the other curve of the twisted pair to which $E_{a,b}(F_p)$ belongs. Twisted pair factor $\beta$ 606 is used to select this elliptic curve. Therefore, the elliptic curve actually used is $E_{a\beta^2,b\beta^3}(F_p)$.

Figure 6C:
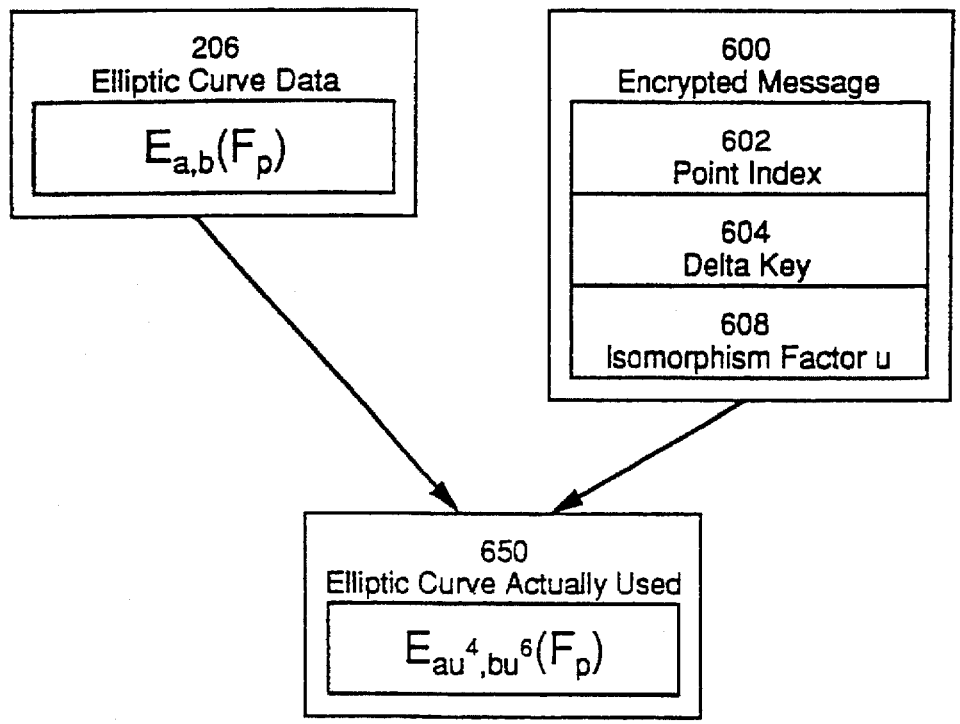
FIG. 6c is a schematic representations of the data used in another embodiment of the present invention.

FIG. 6c is a schematic representation of the data used in another embodiment of the present invention. In this embodiment, elliptic curve data partition 206 contains data which represents the elliptic curve $E_{a,b}(F_p)$. Encrypted message 600 includes point index 602, delta key 604 and isomorphism factor u 608. The presence of only isomorphism factor u 608 in encrypted message 600 signals decryption routines 204 to select for use, in step 508 of FIG. 5 above, a curve which is isomorphic to $E_{a,b}(F_p)$. Isomorphism factor u 608 is used to select this elliptic curve. Therefore, the elliptic curve actually used is $E_{au^4,bu^6}(F_p)$.

Figure 6D:
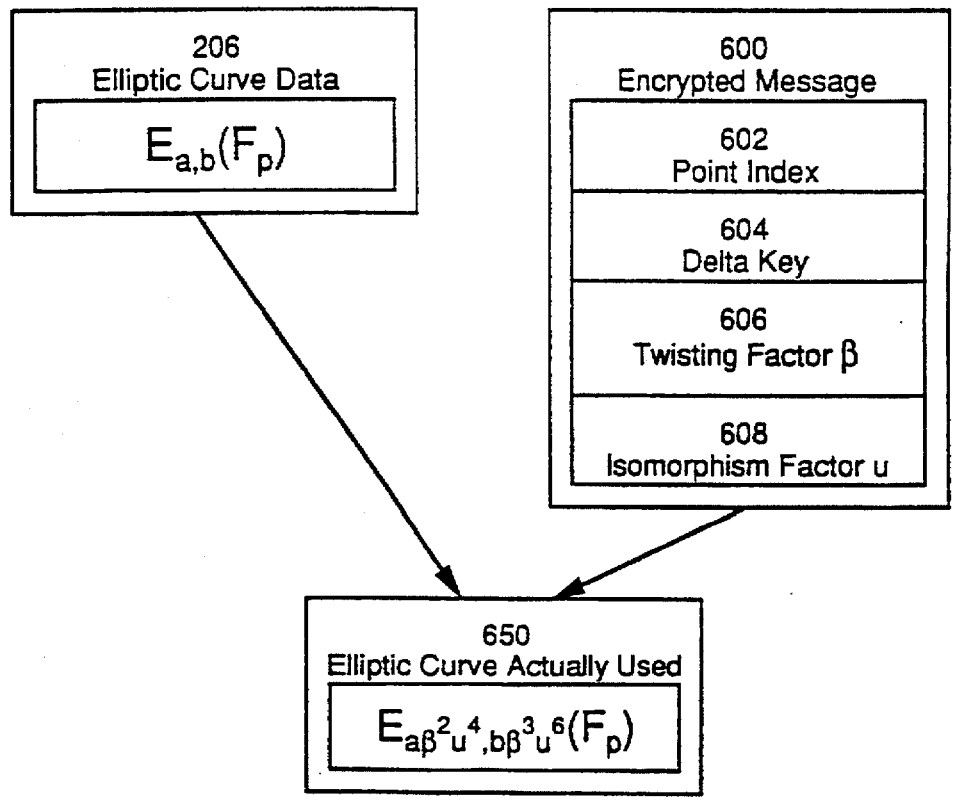
FIG. 6d is a schematic representations of the data used in another embodiment of the present invention.

FIG. 6d is a schematic representation of the data used in another embodiment of the present invention. In this embodiment, elliptic curve data partition 206 contains data which represents the elliptic curve $E_{a,b}(F_p)$. Encrypted message 600 includes point index 602, delta key 604, twisted pair factor $\beta$ 606, and isomorphism factor u 608. The presence of both twisted pair factor $\beta$ 606 and isomorphism factor u 608 in encrypted message 600 signals decryption routines 204 to select for use, in step 508 of FIG. 5 above, a curve which is the other curve of the twisted pair to which a curve isomorphic to $E_{a,b}(F_p)$ belongs. Twisted pair factor $\beta$ 606 and isomorphism factor u 608 are used to select this elliptic curve. Therefore, the elliptic curve actually used is $E_{a\beta^2 u^4, b\beta^3 u^6}(F_p)$.

Although specific embodiments have been described, it will be seen by one of skill in the art that there are other embodiments possible, which are equivalent.

What is claimed is:

1. A method of encrypting, at a processing center computer system, information to be sent to a user, the processing center computer system comprising a processor, a memory, an input device and an output device, comprising the steps of:

storing, in the memory of the processing center computer system, information representing an elliptic curve;

providing information to be encrypted;

responsive to receiving a user key from a user, inputting the user key into the processing center computer system;

selecting a first point on the elliptic curve having an index corresponding to the information to be encrypted;

determining a second point on the elliptic curve related to the first point on the elliptic curve based on the user key;

determining an index of the second point on the elliptic curve;

generating the encrypted message from the index of the second point on the elliptic curve and information based on the user key which relates the second point on the elliptic curve to the first point on the elliptic curve; and transmitting the encrypted message to the user.

2. The method of claim 1, wherein the step of determining a second point on the elliptic curve comprises the steps of:

selecting a center key, the center key being the sum of the user key and a delta key, the delta key being selected so that the center key is prime relative to the number of points on the elliptic curve;

determining the inverse of the center key; and multiplying the first point on the elliptic curve by the inverse of the center key.

3. The method of claim 1, wherein the step of generating an elliptic curve comprises the steps of:

generating a first elliptic curve;

selecting a twisted pair factor $\beta$; and generating a second elliptic curve which forms a twisted pair with the first elliptic curve, using the selected twisted pair factor $\beta$.

4. The method of claim 3, wherein the encrypted message further includes the twisted pair factor $\beta$ identifying the second elliptic curve.

5. The method of claim 3, wherein the first elliptic curve and the second elliptic curve are selected so the number of points on each curve is prime.

6. The method of claim 1, wherein the step of generating an elliptic curve comprises the steps of:

generating a first elliptic curve;

selecting an isomorphism factor u; and generating a second elliptic curve which is isomorphic with the first elliptic curve, using the selected isomorphism factor u.

7. The method of claim 6, wherein the encrypted message further includes the isomorphism factor u identifying the second elliptic curve.

8. The method of claim 6, wherein the first elliptic curve and the second elliptic curve are selected so the number of points on each curve is prime.

9. The method of claim 1, wherein the step of selecting an elliptic curve for use comprises the steps of:

generating a first elliptic curve;

selecting an isomorphism factor u;

generating a second elliptic curve which is isomorphic with the first elliptic curve, using the selected isomorphism factor u.

selecting a twisted pair factor $\beta$; and generating a third elliptic curve which forms a twisted pair with the second elliptic curve, using the selected twisted pair factor $\beta$.

10. The method of claim 9, wherein the encrypted message further includes the isomorphism factor u identifying the second elliptic curve and the twisted pair factor $\beta$ identifying the third elliptic curve.

11. The method of claim 9, wherein the first elliptic curve, the second elliptic curve and the third elliptic curve are selected so the number of points on each curve is prime.

12. The method of claim 1, wherein the step of selecting an elliptic curve for use comprises the steps of:

generating a first elliptic curve;

selecting an isomorphism factor u and a twisted pair factor $\beta$; and generating a second elliptic curve which is an isomorphic twisted pair of the first elliptic curve, using the selected isomorphism factor u and the selected twisted pair factor $\beta$.

13. The method of claim 12, wherein the encrypted message is generated further from the isomorphism factor u and the twisted pair factor $\beta$ together identifying the second elliptic curve.

14. The method of claim 12, wherein the first elliptic curve and the second elliptic curve are selected so the number of points on each curve is prime.

15. A method of decrypting information at a user computer system comprising a processor, a memory, an input device and an output device, comprising the steps of:

storing, in the memory of the user computer system, information representing an elliptic curve;

generating a user key;

transmitting, to a processing center, a message including the user key;

receiving, from the processing center, a message comprising the index of a first point on an elliptic curve and information based on the user key which relates the first point on the elliptic curve to a second point on the elliptic curve;

determining a first point on the elliptic curve based on the received index of the first point;

determining the second point on the elliptic curve using the information based on the user key which relates the first point on the elliptic curve to the second point on the elliptic curve;

generating an index of the second point, the index corresponding to the decrypted information.

16. The method of claim 15, wherein the information based on the user key which relates the first point on the elliptic curve to a second point on the elliptic curve is a delta key and the step of determining a second point on the elliptic curve comprises the steps of:

generating a center key which is the sum of the user key and the delta key; and multiplying the first point on the elliptic curve by the center key.

17. The method of claim 15, further comprising the steps of:

accessing the information representing the elliptic curve stored in the memory; and selecting the elliptic curve for use.

18. The method of claim 15, wherein the message received at the user computer system further comprises the twisted pair factor $\beta$, further comprising the steps of:

accessing the information representing a first elliptic curve stored in the memory;

generating information representing a second elliptic curve which forms a twisted pair with the first elliptic curve using the twisted pair factor $\beta$; and selecting the second elliptic curve for use.

19. The method of claim 15, wherein the message received at the user computer system further comprises the isomorphism factor u, further comprising the steps of:

accessing the information representing a first elliptic curve stored in the memory;

generating information representing a second elliptic curve which is isomorphic with the first elliptic curve using the isomorphism factor u; and selecting the second elliptic curve for use.

20. The method of claim 15, wherein the message received at the user computer system further comprises the twisted pair factor $\beta$ and the isomorphism factor u and the step of selecting an elliptic curve for use comprises the steps of:

accessing the information representing a first elliptic curve stored in the memory;

generating information representing a second elliptic curve which is isomorphic with the first elliptic curve using the isomorphism factor u;

generating information representing a third elliptic curve which forms a twisted pair with the second elliptic curve using the twisted pair factor $\beta$; and selecting the third elliptic curve for use.

21. A processing center computer system for encrypting information, the encrypted information to be sent to a user computer system, comprising:

a memory storing information to be encrypted and information relating to an elliptic curve;

the processing center computer system programmed to:

accept a user key received from the user computer system;

select a first point on the elliptic curve having an index representing the information to be encrypted;

determine a second point on the elliptic curve related to the first point on the elliptic curve based on the user key; and transmit to the user a message comprising the index of the second point on the elliptic curve and information based on the user key which relates the second point on the elliptic curve to the first point on the elliptic curve as encrypted information for the user computer system.

22. The system of claim 21, wherein the step of determining a second point comprises the steps of:

selecting a center key, the center key being the sum of the user key and a delta key, the delta key selected so that the center key is prime relative to the number of points on the elliptic curve;

determining the inverse of the center key; and multiplying the first point on the elliptic curve by the inverse of the center key.

23. The system of claim 21, further comprising:

a generator, generating an elliptic curve and storing the elliptic curve in the memory.

24. The method of claim 23, wherein the elliptic curve is selected so the number of points on the curve is prime.

25. The system of claim 21, further comprising:

a first generator, generating a first elliptic curve;

a selector, selecting a twisted pair factor $\beta$; and a second generator, generating a second elliptic curve which forms a twisted pair with the first elliptic curve using the twisted pair factor $\beta$ and storing the second elliptic curve in the memory.

26. The system of claim 25, wherein the message transmitted to the user further comprises the twisted pair factor $\beta$ identifying the second elliptic curve.

27. The method of claim 25, wherein the first elliptic curve and the second elliptic curve are selected so the number of points on each curve is prime.

28. The system of claim 21, further comprising:

a first generator, generating a first elliptic curve;

a selector, selecting an isomorphism factor u; and a second generator, generating a second elliptic curve which is isomorphic with the first elliptic curve using the isomorphism factor u and storing the second elliptic curve in the memory.

29. The system of claim 28, wherein the message transmitted to the user further comprises the isomorphism factor u identifying the second elliptic curve.

30. The method of claim 28, wherein the first elliptic curve and the second elliptic curve are selected so the number of points on each curve is prime.

31. The system of claim 21, further comprising:

a first generator, generating a first elliptic curve;

a selector, selecting an isomorphism factor u and a twisted pair factor $\beta$;

a second generator, generating a second elliptic curve which is isomorphic with the first elliptic curve, using the isomorphism factor u; and a third generator, generating a third elliptic curve which forms a twisted pair with the second elliptic curve, using the twisted pair factor β and storing the third elliptic curve in the memory.

32. The system of claim 31, wherein the message transmitted to the user further comprises the isomorphism factor u identifying the second elliptic curve and the twisted pair factor β identifying the third elliptic curve.

33. The method of claim 31, wherein the first elliptic curve and the second elliptic curve are selected so the number of points on each curve is prime.

34. A user computer system for decrypting information from a processing center, comprising:

a memory storing information relating to an elliptic curve; the user computer system programmed to:
generate a user key;
transmit, to the processing center a message including the user key;
receive, from the processing center, a message comprising the index of a first point on the elliptic curve and a delta key;
generate a center key which is the sum of the user key and information based on the user key which relates the first point on the elliptic curve to a second point on the elliptic curve;
determine the first point on the elliptic curve based on the index of the first point;
determine the second point on the elliptic curve using the information based on the user key which relates the first point on the elliptic curve to the second point on the elliptic curve; and
generate an index of the second point, the index corresponding to the decrypted information.

35. The system of claim 34, wherein the information based on the user key which relates the first point on the elliptic curve to a second point on the elliptic curve is a delta key and the step of determining a second point on the elliptic curve comprises the steps of:

generating a center key which is the sum of the user key and the delta key; and
multiplying the first point on the elliptic curve by the center key.

36. The system of claim 34, wherein the user computer system is further programmed to:
access the information relating to the elliptic curve stored in the memory.

37. The system of claim 34, wherein the received message further comprises the twisted pair factor β and the user computer system is further programmed to:
access the information relating to a first elliptic curve stored in the memory;
generate information relating to a second elliptic curve which forms a twisted pair with the first elliptic curve using the twisted pair factor β; and
select the second elliptic curve for use.

38. The system of claim 34, wherein the received message further comprises the isomorphism factor u and the user computer system is further programmed to:
access the information relating to a first elliptic curve stored in the memory;
generate information relating to a second elliptic curve which is isomorphic with the first elliptic curve using the isomorphism factor u; and select the second elliptic curve for use.

39. The system of claim 34, wherein the received message further comprises the twisted pair factor β and the user computer system is further programmed to:
access the information relating to a first elliptic curve stored in the memory;
generate information relating to a second elliptic curve which is isomorphic with the first elliptic curve using the isomorphism factor u; and
generate information relating to a third elliptic curve which forms a twisted pair with the second elliptic curve using the twisted pair factor β; and
select the third elliptic curve for use.

40. A program storage device readable by a machine, tangibly embodying a program of instructions executable by the machine to perform method steps for decrypting information at a user computer system, the method steps comprising:

storing, in the memory of the user computer system, information representing an elliptic curve;
providing to the user a user key;
requesting a user to provide information to be decrypted;
accepting from the user the information to be decrypted, the information comprising the index of a first point on an elliptic curve and information based on the user key which relates the first point on the elliptic curve to a second point on the elliptic curve;
determining a first point on the elliptic curve based on the index of the first point;
determining the second point on the elliptic curve using the information based on the user key which relates the first point on the elliptic curve to the second point on the elliptic curve;
generating an index of the second point, the index corresponding to the decrypted information.

41. The program storage device of claim 40, wherein the information based on the user key which relates the first point on the elliptic curve to a second point on the elliptic curve is a delta key and the step of determining a second point on the elliptic curve comprises the steps of:

generating a center key which is the sum of the user key and the delta key; and
multiplying the first point on the elliptic curve by the center key.

42. The program storage device of claim 40, the method steps further comprising the step of:
accessing the information relating to the elliptic curve stored in the memory.

43. The program storage device of claim 40, wherein the message received at the user computer system further comprises the twisted pair factor β and the method steps further comprise the steps of:
accessing the information relating to a first elliptic curve stored in the memory;
generating information relating to a second elliptic curve which forms a twisted pair with the first elliptic curve using the twisted pair factor β; and
selecting the second elliptic curve for use.

44. The method of claim 40, wherein the message received at the user computer system further comprises the isomorphism factor u and the method further comprises the steps of:

accessing the information relating to a first elliptic curve stored in the memory;

generating information relating to a second elliptic curve which is isomorphic with the first elliptic curve using the isomorphism factor u; and selecting the second elliptic curve for use.

45. The method of claim 40, wherein the message received at the user computer system further comprises the twisted pair factor $\beta$ and the isomorphism factor u and the method further comprises the steps of:

accessing the information relating to a first elliptic curve stored in the memory;

generating information relating to a second elliptic curve which is isomorphic with the first elliptic curve using the isomorphism factor u;

generating information relating to a third elliptic curve which forms a twisted pair with the second elliptic curve using the twisted pair factor $\beta$; and selecting the third elliptic curve for use.

* * * * *